Sept. 30, 1941.   P. W. NEFF   2,257,511
TRANSMISSION
Filed Dec. 6, 1937   2 Sheets-Sheet 1
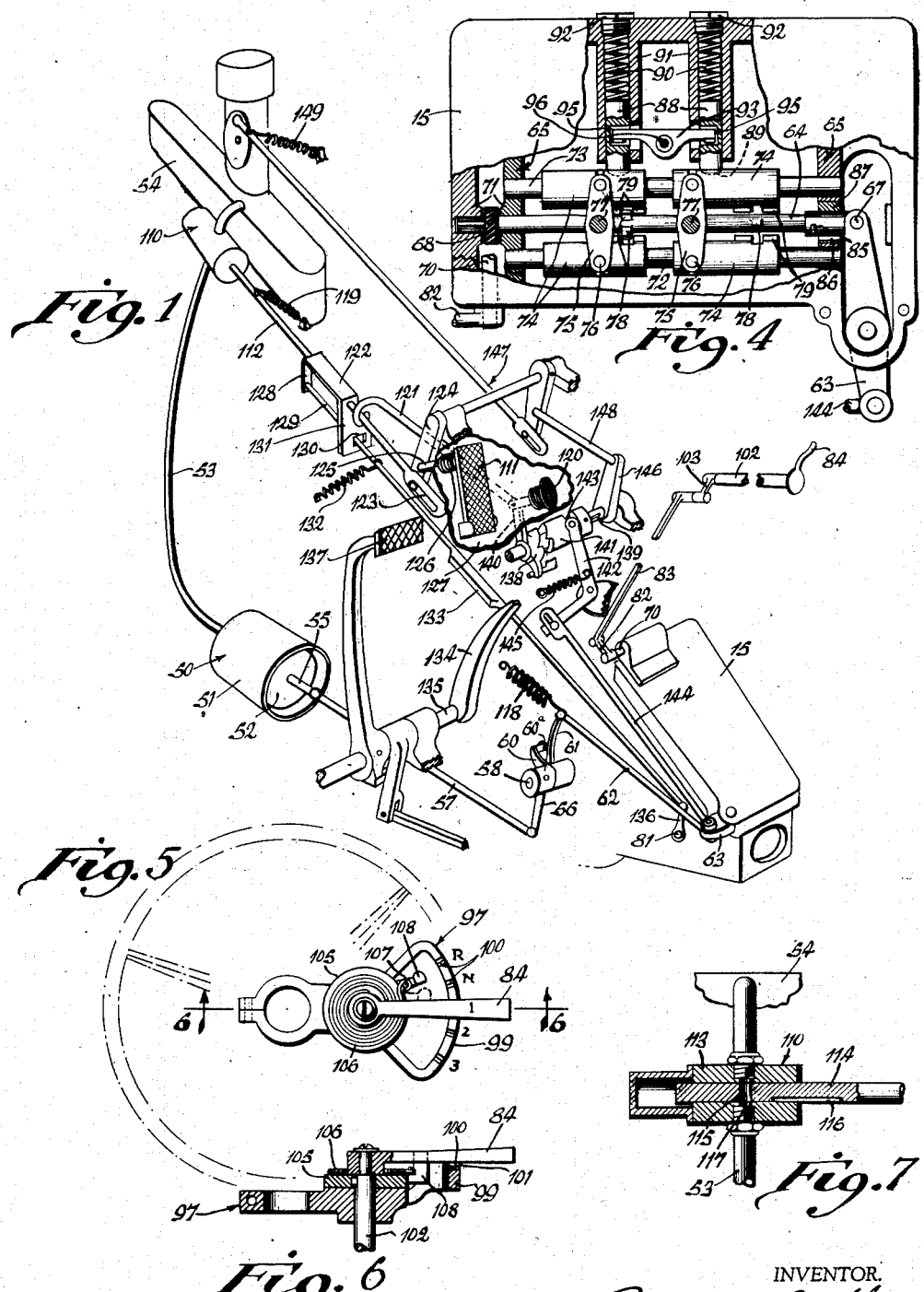
INVENTOR.
Paul W. Neff
BY Wood & Wood
ATTORNEYS

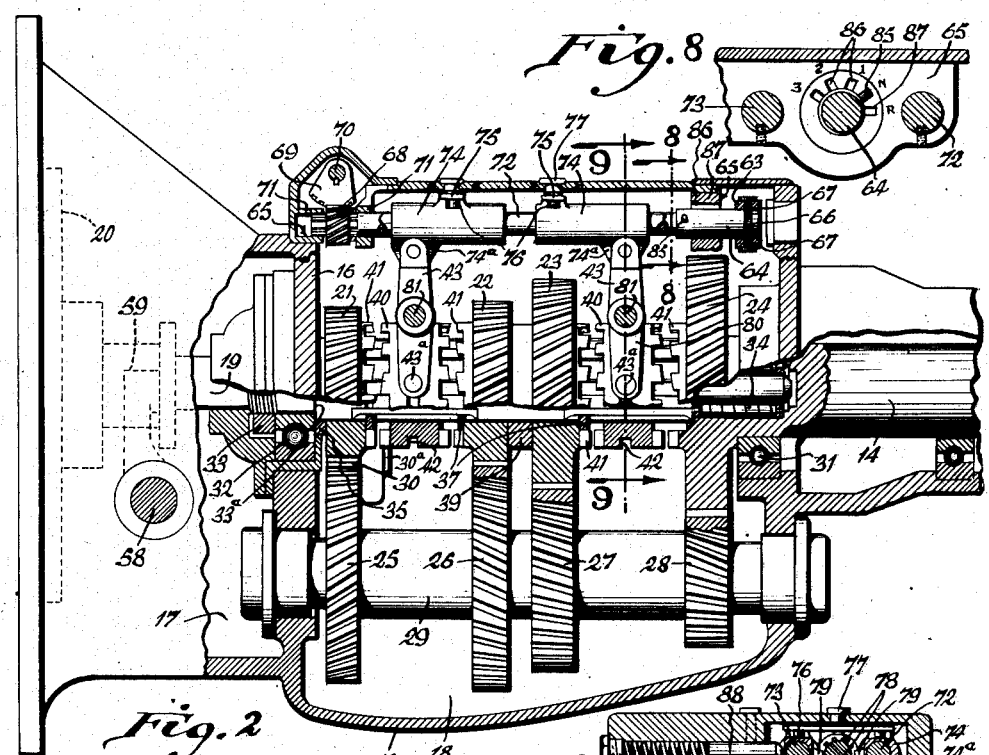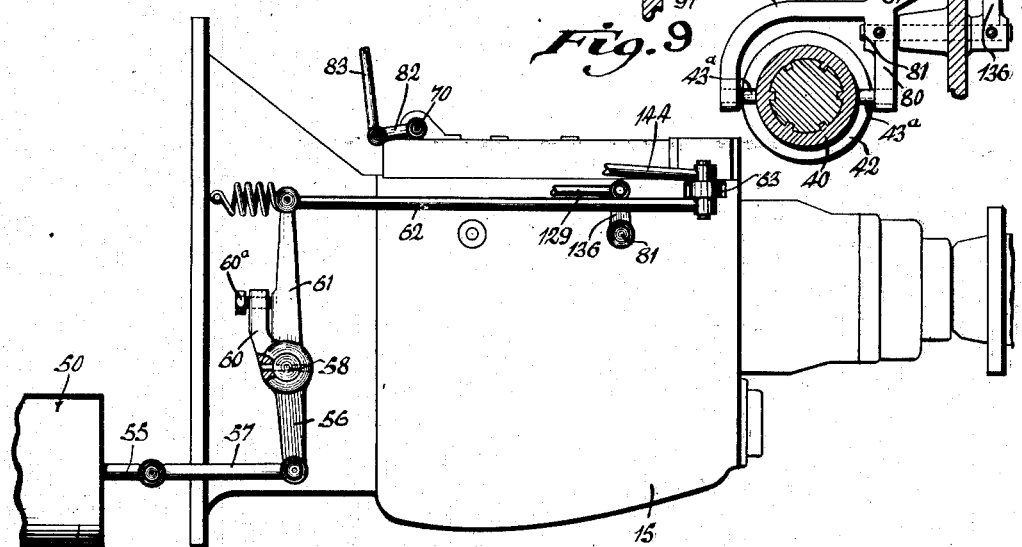

Patented Sept. 30, 1941

2,257,511

UNITED STATES PATENT OFFICE 2,257,511

TRANSMISSION

Paul W. Neff, New Kensington, Pa.

Application December 6, 1937, Serial No. 178,267

23 Claims. (Cl. 192—.01)

This invention relates to transmissions and is particularly directed to a semi-automatic speed change transmission of the type shown in my Patent 1,687,139, granted October 9, 1928. In this type of transmission the gear changes are selected by the operator, but the actual shifting of the clutch and gears is accomplished automatically, in proper sequence, when the engine accelerator is operated. The present invention is directed to improvements in the structure of the transmission and control system, whereby the transmission unit is rendered more flexible than it has been heretofore and aside from the necessary manual operation of selecting the speed changes, is completely automatic as to speed changes.

One of the difficulties inherent in this arrangement is the fact that each time the accelerator is released the clutch and gears disengage, thus allowing the car to coast. During this coasting period, the gear shift mechanism operates to change gears to the next higher speed change, if a change is to be made. However, when the car is in high gear and no change is to be made, it is sometimes undesirable to have the gears and clutch disengaged, as the compression of the engine is then not available in slowing the car.

It has been the practice in the past, in manual selective automatic transmissions of this type to provide a control means of some sort whereby the clutch and gears may be positively locked against disengagement when necessary. However, this control has usually been manually operated, so as not to interfere with the automatic operation of the transmission. The usual procedure has been to shift the gears automatically, permitting the automatic disengagement of clutch and gears until the high gear is engaged, and, at this time, to manually lock the mechanism in mesh.

Another difficulty has been encountered heretofore in shifting from high to a lower gear as is sometimes necessary when descending unusually steep hills or when the road is slippery. At such times, the most practicable expedient has been to bring the car to a stop, then to select the proper gear, and, when engaged, to operate the lock-out control in order to prevent disengagement.

It has been an object of the present inventor to provide an improved speed change transmission and control system, in which the gear changes are made by power, and in which the gears and clutch are positively and automatically locked against disengagement, when the transmission is in high gear, and subject to disengagement, when so desired, by a slight manipulation of the regular brake pedal of the car.

Another object of the inventor has been to provide an improved automatic control arrangement, whereby, the gears may be changed from high gear to a lower gear, while the car is in motion, by merely selecting the desired lower gear and depressing a pedal, whereupon the engine is accelerated in order to permit meshing of the gears, and automatically throttled to idling speed when the gears are meshed, so as to utilize the braking effect of the engine.

Further advantages have been achieved in the present invention by the provision of a transmission system which has been generally improved and in which the selector and shifter mechanism is more efficient.

These objects and advantages will be more fully apparent from the specification and drawings forming a part of this disclosure, in which:

Figure 1 is a diagrammatic perspective view of a portion of an automobile motor, floor board, and transmission casing, illustrating the control system of the improved gear shifting transmission of this invention.

Figure 2 is a horizontal sectional view taken through a transmission incorporating the present improvements.

Figure 3 is a side elevation of the transmission of Figure 2, illustrating the operating linkage and vacuum unit thereon.

Figure 4 is a top plan view of the transmission casing, partially in section, illustrating the selector rod, the operating sleeves for the shifting yokes, and the interlock arrangement.

Figure 5 is a top plan view of the preselector unit as installed on the steering wheel of the car.

Figure 6 is a sectional view taken on line 6—6, Figure 5.

Figure 7 is a sectional view of the vacuum unit control valve.

Figure 8 is a sectional view taken on line 8—8, Figure 2, illustrating the locking and indexing unit of the selector control rod.

Figure 9 is a sectional view taken on line 9—9, Figure 2, illustrating one of the shifter yokes in relation to the sleeves and the selector control mechanism.

For the purpose of illustrating an adaptation, the invention has been disclosed in the speed change gear transmission of an automobile. This transmission is mounted in a transmission case which extends back from the motor of the automobile and includes a fly wheel or clutch compartment and a gear compartment.

It is to be understood that any type of clutch mechanism may be operated by means of the apparatus of the present invention, in conjunction with the gear shifting mechanism. The clutch illustrated has a slidable member which is moved inwardly for disengagement of the clutch members in disconnecting the motor from the transmission. The clutch mechanism may be contained within the fly wheel of the motor car.

Gearing

The gear-set, as illustrated, contains the customary arrangement of gears, providing three forward speeds and a reverse. The gearing shown is of the constant mesh type, there being four sets of constantly meshing gears for accomplishing the forward and reverse speeds above mentioned.

In operation, the gears are preselected by means of a manually operated lever, and the actual shifting motion is imparted by a vacuum operated gear shifting and clutch actuating device. This device disengages the clutch and shifts the selected gear in mesh, automatically and in proper sequence.

Referring specifically to the drawings, the transmission casing is indicated at 15. This casing incorporates an intermediate wall 16 creating a clutch compartment 17 and gear compartment 18. A main drive shaft 19 extends to the rear from the fly wheel 20 and clutch assembly and is located longitudinally of, and approximately centrally of, the transmission casing.

Gears 21, 22, 23 and 24 (one gear of each set of continually meshing gears) are loosely mounted on the drive shaft 19. The other gears of the set, namely, gears 25, 26, 27 and 28, are fixed on a counter-shaft 29. The reverse speed set, namely, gears 21 and 25, includes a reversing gear 30 which is mounted on a stub shaft 30a and interposed between the gears 21 and 25. Gear 24 is formed as a part of a propeller shaft 14 and is included in the drive for all speeds and reverse. In the case of direct drive, or high speed, the drive shaft is connected directly to the gear 24 without passing through the counter-shaft. The arrangement of the gear set for reverse is well understood and for that reason is not more completely illustrated.

As shown in the drawings, the gears 21, 22, 23, and 24 range in size, from small at the forward end of the drive shaft, to large at the rear end. The large gear 24, at the rear of the drive shaft, is journalled in ball bearing 31, which supports the forward end of the propeller shaft in the wall of the casing. The forward end of the drive shaft 19 is supported in a ball bearing 32 and is maintained against longitudinal displacement by means of a nut 33 screwed on a counter-turned portion of the shaft and engaging the inner race of the ball bearing 32. This nut holds the bearing race against the shoulder 33a formed by the counter-turned portion of the shaft. The rear end of the drive shaft 19 is journalled in roller bearings 34, in an axial socket at the forward end of the propeller shaft.

The gears on the drive shaft are adapted to be coupled thereto by means of clutches or coupling mechanisms. The gears 21, 22, 23, and 24, considered in their longitudinal arrangement, are controlled or arranged in pairs, namely, a forward and a rear pair with a clutch mechanism interposed between the gear elements of each pair. The gears are fixed in position against longitudinal displacement by means of lock washers 37 engaged in annular grooves in the shaft. The gear 21 is held against a washer 35, bearing against the inner race of the ball bearing 32. Gears 22 and 23 are held together against a spacer sleeve 39.

The clutch, or coupling mechanism, consists, in each instance, of a clutch block or collar 40 in splined connection with the drive shaft 19 and slidably mounted between each pair of gears. The collars are provided with coupling teeth and are adapted to engage in driving relationship with the adjacent teeth 41 formed on the hubs of the gears. Each clutch collar is provided with an annular groove 42 providing for operative engagement with a shifter yoke 43 adapted to shift the collar into driving engagement with the selected gear.

Since the gears are loosely journalled and the clutch collars are in splined connection on the shaft 19, shifting of a clutch collar into engagement with the teeth of a gear results in establishing a driving connection between the drive shaft and the gear, through the clutch collar.

Each of the clutch collar teeth and the adjacent gear hub teeth has slightly inclined or angular engaging faces as shown in Figure 2 of the drawings. The angles, in each instance, are identical and, in the case of the coupling collars, slope inwardly from the leading edges of the teeth, that is, the teeth are lower at the rear edge according to the direction of rotation of the collars which are splined to the drive shaft 19.

Because of this arrangement of the teeth, the clutches engage positively in one direction when the teeth are brought into surface contact (end to end) and become locked for unitary rotation in each direction after complete engagement.

If the propeller shaft tends to overrun the drive shaft and clutch collars the sloping faces simply slide over each other and no coupling ensues. If the drive shaft speed is greater than the propeller shaft speed the leading edges of the clutch collar teeth engage the high rear edges of the clutch teeth on the gears and coupling ensues, the teeth then dropping into complete mesh. If the teeth engage, bevel face to bevel face, as the shift occurs, they will slip into mesh under spring influence as the drive shaft speeds up.

It will be observed that when both of the clutch elements are centered in position between the gears, the transmission is in neutral. When the forward clutch element 40 is shifted into engagement with the small gear 22, the transmission is in low gear. The drive takes place through the gear 22, the large gear 26 through the counter-shaft, and from the small gear 28 thereof to the large gear 24 on the axis of the drive shaft. This gear is in constant and direct connection with the rear axle of the motor car through the propeller shaft 14.

The forwardly disposed coupling element, when shifted in the opposite direction, connects the drive through the gear 21 on the main drive shaft, reverse gear 30, gear 25 on the counter-shaft, and thence to the rear axle as described. The rearmost clutch element, when shifted forwardly, results in second speed through gears 23 and 27 to the rear axle as described. When the rearmost clutch element is shifted to the rear, the drive shaft is connected directly to gear 24, and the transmission is in high gear.

The coupling elements of the gear transmission and the main fly wheel clutch are actuated by a clutch and gear shifting apparatus of the following description.

Gear coupling means

The vacuum or suction device 50, including cylinder 51 and piston 52, is secured on the side of the transmission casing. A suction line 53 extends between the intake manifold 54 of the engine to one end of the vacuum cylinder. The suction operated piston has its rod 55 connected to a lever 56 by means of a link 57. The lever 56 is secured on a shaft 58 by means of a pin. A clutch throw-out yoke 59 (see Figure 2) is fixed on the inner end of this shaft. An actuating arm 60 extends upwardly of the lever 56, integral therewith, and is traversed by an adjustment screw 60a at its upper end in contact with a lever 61, loosely journalled on the shaft 58. The upper end of the lever 61 has a pivoted connection to a link 62, the rear end of which connects to the outer end of a fulcrumed gear shifting lever 63, of the gear selecting and shifter mechanism. In the clutch disengaging movement of the lever 56, the screw 60a contacts lever 61 and moves it to disengage the gears.

The lever 63 of the shifting mechanism is bifurcated at its inner end and has a yoke connection to a translatable selector rod 64, slidably and rotatably mounted in lugs 65, 65 within the transmission casing 15. The yoke connection consists of a groove 66 in the rod, engaged by pins 67 at the yoke portion of the lever, adapting the rod to be shifted longitudinally upon actuation of the lever 63, and permitting rotation of the rod for gear selection.

The opposite or forward end of the rod is provided with a spiral gear 68 in mesh with a segmental spiral gear 69, secured on a cross shaft 70. The gear 68 is in splined connection with the selector rod and is held in place between a pair of lugs 71, through which the shaft is journalled. The splined portion of the shaft upon which the spiral gear is mounted of sufficient length to permit longitudinal movement of the shaft as imparted by the lever 63 for shifting the coupling element as hereinafter described.

The shifter blocks or collars 40 are actuated by means of the selector rod 64 in the following manner. A pair of shafts 72, 73 are secured in the top casing, or cover, adjacent and parallel to the selector rod 64, one on each side thereof (see Figure 4). Each of the shafts, 72 and 73, carries a pair of shifter sleeves 74, longitudinally translatable on the respective shafts, each adjacent pair of parallel sleeves being coupled together for motion in opposite direction by means of a centrally pivoted lever 75. Each lever has its ends pivoted to its particular pair of sleeves by means of pins 76 attached to the outer ends of the lever and engaged in transverse slots formed in the sleeves. The levers are pivoted at their centers on pins 77.

The selector rod 64 is provided with four radially projected coupling pins 78, one for each of the three forward speed positions and the reverse position of the coupling blocks. These are arranged in pairs, the elements of each pair being circumferentially spaced and located adjacent to, and between, a pair of the parallel shifter sleeves 74. Each of the shifter sleeves is provided with a pair of spaced lugs 79, between which a respective pin 78 is adapted to engage, so as to transmit the longitudinal shifting motion of the selector rod to the preselected sleeve.

The clutch or coupling blocks 40, 40 are connected to certain of the shifter sleeves 74 in the following manner. As stated, each of the pairs of parallel shifter sleeves are pivotally connected to opposite ends of a particular fulcrumed lever 75, so that, in shifting, the pair of sleeves will be moved simultaneously in the opposite directions. One sleeve of each pair of shifter sleeves 74, namely, those of shaft 72, includes a downwardly projected lug 74a on which is pivoted the upper end of one of the pair of shifter yokes 43—43.

Each yoke is disposed in shifting engagement, at its lower end, with one of the pair of coupling blocks, by means of the pins 43a of the yoke in the annular groove 42 of the coupling element. The shank 80 of each shifter yoke is fulcrumed medially of its length on a stud bearing 81, thus effecting a rocking lever connection between the sleeve 74 and the coupling element 40. This arrangement prevents binding of the parts, which might otherwise occur were the parts secured together as a unit for direct operation.

In selecting the gears to be shifted, the selector rod 64 is rotated so as to move one of the pins 78 into registry between the pair of lugs of the particular sleeve 74 to be shifted. The rotary motion is transmitted to the rod through the pair of spiral gears 68 and 69 at one end thereof. One of these gears, namely, 69, is keyed to the rock shaft 70 journalled in the transmission casing. This shaft is actuated by a crank 82 in connection with a link 83, operated from a control lever 84 mounted in the driver's compartment of the car. The operation of the control lever will be subsequently described.

The gear 68, as stated, is slidably keyed on the selector rod 64. This arrangement permits the rod to be rotated for purposes of selection, by means of the gears 68 and 69, and permits the subsequent operation of shifting the gears by means of the longitudinal shifting of the rod.

The selector rod 64, on the opposite end, is provided with an arrangement to prevent rotation of the rod when any one of the gears is in mesh. This arrangement consists of a radial pin 85 projecting from the rod and adapted to engage in any one of a series of five radial slots 86, formed in an element 87 secured in the end wall 65 of the transmission casing. The pin 85 is engaged in one of the notches 86 when the selector rod 64 is in gear meshing position. The slots 86 correspond to the radial positions to which the pin 85 is revolved for each of the four gear changes and neutral. The longitudinal shifting of the rod for bringing one of the gears into mesh moves the pin 85 into one of the slots corresponding to the appropriate gear selecting position. The rod, therefore, cannot be rotated for the next gear selection until it is shifted inwardly to insure that all gears are in neutral before selecting and shifting the desired gear.

Interlock

The shifter sleeves 74 of the shaft 73 are provided with an interlock to prevent the coupling of more than one set of gears at a time. This interlock consists of a pair of detent plungers 88, each cooperating with a notch 89 formed in a particular sleeve. Each plunger is urged against its sleeve by means of a spring 90. The plungers and springs are held in the bores of respective tubular extensions 91, integral with the transmission casing, by means of plugs 92. An interlock lever 93 has its opposite ends engaged in slots 95 in the respective plungers and is adapted to rock on a pivot pin 96 centrally of its length. The clearance between the ends of the lever and the end walls of the slots allows sufficient movement to permit one of the plungers to be moved outwardly as a sleeve is shifted, the plunger being forced outwardly on leaving the notch. The interlock lever is then in locking engagement with the other plunger holding it firmly against displacement from the slot in which it is engaged, thus preventing movement of the sleeve until the other sleeve is returned to gear uncoupling position.

Gear selector means

The manually operated gear selecting unit 97 may be mounted on the steering post of the car and includes the lever 84 in operating relationship with a stationary quadrant 99. The quadrant has a series of five notches 100 on its upper edge adapted to be engaged by a spur 101 on the under side of the lever (see Figure 6). The notches determine the position of the lever for the four gear changes and neutral, and serve to retain the lever in position until the lever is moved by hand for the next gear change.

The hand lever is loosely journalled on a counter-turned portion of a vertical shaft 102. This shaft extends to a point adjacent to the forward end of the transmission casing and is provided with a crank arm 103 at its lower extremity. This crank is connected by the link 83 to the crank 82 secured on the rock shaft 70, and, in this manner, the movements of the vertical shafts are transferred to the rock shaft and, thence, to the selector rod by means of the gears 68 and 69.

As previously described, the selector rod 64 cannot be rotated for gear selection unless the rod is thrust inwardly into the position it assumes when the clutch is disengaged, that is, with the pin 85 clear of the index notches 86. This arrangement makes certain that the gear which previously had been coupled, has been returned to neutral.

As previously mentioned, the hand selector lever 84 is loosely journalled on the shaft 102. Directly beneath the hub of this lever is mounted a collar 105 keyed to the shaft. A flat coiled spring 106 is disposed on the upper face of this collar and has its outer end anchored to a pin 107 fixed to this collar. The inner end of the coil spring is anchored in the hub of the lever, so that the spring exerts a force tending to revolve the collar in a clock-wise direction, while the hand lever is engaged in one of the notches of the quadrant. Thus, it is apparent that the spring moves the selector rod to the position permitted by the position of the lever 84, when the rod is moved from gear engaged position.

This spring torque is transmitted to the selector rod through the rock shaft and gears, so that the shaft is revolved as soon as the lock pin 85 is free of the notch. At this time, one of the pins 78 of the rod is brought to rest between the lugs of a sleeve to bring about the desired gear coupling. The degree of rotation of the rod for the selection is determined by a stop finger 108 extending from the collar. The finger is disposed so as to contact the side of the hand lever, in order to act as a positive stop against rotation of the shaft beyond the point determined by the position of the hand lever, the hand lever being engaged in one of the notches of the quadrant.

Accelerator means

In Figure 1, the improved transmission and the control mechanism has been shown diagrammatically in relation to the operating controls of an automobile. The suction line 53 for the vacuum device 50 operating the clutch and gear shifting apparatus extends to the intake manifold 54 of the motor. A valve 110 is incorporated in this line and is actuated by the accelerator 111, being connected therewith by means of a rod 112. The valve (see Figure 7) incorporates a body 113 and a slide valve element 114, the element having a diametric passageway 115 and a longitudinal groove 116.

When the accelerator is in normal position, with the motor idling, the passageway 115 is aligned with the cross bore 117 forming a part of the vacuum line 53. This connects the suction line from the manifold to the vacuum device so as to disengage the clutch and neutralize the gear shifting apparatus by movement of lever 63. When the accelerator is depressed, the groove 116 of the valve element is in communication with the line 53 to the vacuum device, so as to admit atmospheric pressure to the vacuum device 50 and permit engagement of the clutch, the meshing of the gears thereupon being accomplished by means of the spring 118.

It may be seen, therefore, that each time the accelerator is released, the control valve, by virtue of the spring 119, will return the valve to position for actuating the vacuum device, whereby the clutch and gear shifting apparatus is moved for disengaging the clutch and particular gear. Thus, each time the foot is taken from the accelerator in order to slow down, the car coasts under its own momentum with the clutch thrown out. The present control system, however, incorporates automatic devices which prevent this action, except at the will of the operator, as hereinafter disclosed.

Control for braking by engine compression

In order to provide for engine braking, with the gears in second or low, a control pedal 120 is provided adjacent the accelerator pedal 111. This pedal is pivotally connected to a rod 121, the operating end of which loosely encircles the control valve rod 112. The rod 112 has a U-shaped clip 122, secured thereon and adapted to be engaged by the rod 121, when the valve is in idling position, that is, when the accelerator is released.

The rod 112 includes an elongated slot 123 at the end pivoted to the actuating arm 124 which is swung by the accelerator through link 125. The accelerator is held in idling position by means of coil spring 126 disposed around the link 125 between the accelerator and the floor board 127. This slot permits the rod 112 to be moved independently of the accelerator when the engine braking pedal 120 is depressed, that is, when the control valve 110 is moved to clutch and gear engaging position. At this time the engine compression is effective for slowing the speed of the car.

The abutment clip 122 is provided at its forward end with a downwardly projected finger 128 adapted to be contacted by the rod 129. The forward end of the rod 129 is sustained in a lateral slot 130 formed in the second leg 131 of the clip. The rod is drawn laterally against one end of the slot by a coil spring 132, which disposes the contacting end of the rod in line with the finger 128. An inclined lug 133 is formed on the rod 129 medially of its length and is adapted to cooperate with a throw-out arm 134 fixed to the brake shaft 135. The rearwardly extended end of the rod 129 is pivotally connected to a crank arm 136 secured on the outer end of the rock shaft 81 on which is secured the yoke for shifting the coupling element 40 between second and high speeds.

As may be seen from a study of Figure 1 showing the transmission in high gear with the clutch engaged, the rod 129 is moved forwardly when the coupling element engages for high gear. In this position the control valve element 114 is in relief position. The gears are held in mesh by the spring 118, and the rod 129 abuts against the finger 128 of the clip. Thus, when the car is in high gear, it will remain there irrespective of the accelerator position unless the brake pedal is actuated.

When it is desired to disengage the clutch in order to either put the car into free wheeling or change gears, a slight depression of the brake pedal 137 actuates the throw-out lever 134 against the inclined lug 133 on the rod 129. This movement results in a slight lateral movement of the rod as permitted by the lateral slot 130, and the forward end of the rod is dislodged from contact with the finger 128. The spring 119 will then return the valve element 114 to relief or gear disengaging position provided the accelerator is released, and the clutch will be disengaged.

The engine braking pedal 120 is normally ineffective when the car is in high gear (as shown in Figure 1) because of the action of the rod 129 as previously described. The purpose of this pedal is to provide means for utilizing the braking power of the engine when the transmission is in second or low gear, as in descending steep hills or negotiating slippery or bad stretches of road.

In normal operation of the car with the gears in second, low, or reverse, the clutch is disconnected, and the gears automatically are returned to neutral each time the accelerator is released.

When it is desired to shift the transmission from a higher to a lower gear while the car is moving, it is necessary to accelerate the engine considerably in order to get it up to car speed so that the gears may be engaged. For this purpose, the engine braking pedal 120 is in connection with an accelerator coupling element 138 loosely mounted on a cross shaft 139. The coupling element 138 is connected to the engine braking pedal 120 through an arm 140, so that the coupling element makes a partial revolution when the pedal is depressed. A second coupling element 141 is slidably keyed to the cross shaft 139 and adapted to engage the first. The coupling element 141 is actuated by a bell crank lever 142 having a yoke connection to an annular groove 143 of the element. The opposite end of the bell crank lever is pivotally connected to a rod 144 extending from the outer end of the selector rod shifter lever 63.

When the selector rod is in disengaged or in gear selecting position, the outer end of the shifter lever 63, due to the action of the vacuum device, will be in its rearward position, a position opposite to that shown in Figure 1. At this time the rod 144 will permit the bell crank lever to be actuated by a spring 145 in order to engage the two coupling elements together. When the engine braking pedal 120 is depressed to engage the clutch and the selected gear, the movement of the pedal will be transmitted to the cross shaft 139 through the medium of the coupling elements 138 and 141.

The cross shaft 139 includes an arm 146 at its outer end connected to the throttle actuating assembly 147 through a link connection 148. In this manner, on depressing the engine braking pedal, the clutch will be engaged and the engine accelerated further until the gears are synchronized and engaged. Immediately upon gear engagement the outer end of the shifter lever 63 will move forwardly to the position shown in Figure 1 to disengage the couplers on the accelerator shaft 139 so that the throttle is closed by the action of the throttle spring 149, and the engine will function as a brake.

Operation of the apparatus

The apparatus of the present invention operates in the following manner. In order to place the car in motion the preselecting lever 84 is moved into the notch 100 (see Figure 5) which controls low gear. This movement of the lever 84 is transmitted to the selector rod 64 through collar 105, shaft 102, crank arm 103, link 83, crank 82, shaft 70, and gears 69 and 68. This moves the particular coupling pin 78 into engagement with a particular sleeve 74 for shifting the gear clutch element.

The accelerator 111 is then depressed. This moves the groove 116 of the rod 112 to relief position for the vacuum device 50, thus, permitting the spring 118 to swing the arm 63, thereby pulling the rod 64 and the gear clutch element to gear engaging position. This same movement, also through lever 60, engages the clutch in the proper sequence with respect to the gear shift. The car is then in motion in low gear.

Thereupon the lever 84 is moved to the second gear notch 100, and, upon release of the accelerator, the intake manifold is connected to the vacuum device 50 through passageway 115 for disengaging the clutch and shifting the rod 64 into neutral. Upon release of the pin 85 of the rod 64 from the radial slot 86, the collar 105 will follow up the lever 84 to rotate the rod 64 to engagement with the particular sleeve 74 for second gear connection. Depression of the accelerator in the manner described above causes the shift and clutch engagement, and the car is in second gear. In both second and low gears the clutch and gears automatically return to neutral when the accelerator is released.

When the lever 84 is moved to the high gear notch 100 and the accelerator is depressed the clutch and gear are engaged as above described. However, upon release of the accelerator the engagement of the gears remains undisturbed. Thus, the car is not in free wheeling position unless desired. The gears are kept in driving connection due to the fact that the high gear yoke 43 has moved arm 136 and rod 129 to cause engagement of the rod 129 with the clip 122. (See Figure 1.)

When free wheeling is desired the rod 129 is laterally displaced to break the abutment with clip 122 by the camming action of the arm 134 against the inclined lug 133. Slight depression of the brake pedal 137 moves the arm 134 since it is on the brake pedal shaft 135.

Should it be necessary to reengage the transmission in high gear, depression of the accelerator 111 will again cause the relief of the vacuum and of the gear coupling in high gear. Thereupon, the rod 129 again abuts the clip 122, and the gears are maintained in coupled position.

In order to shift from high to a lower gear while the car is moving, the transmission is moved to neutral by depression of the brake pedal 131 and displacement of the rod 129. The lower gear is then selected by means of the preselecting lever 84. Here the lever 84 directly engages and moves the stop finger 108 of the collar 105.

The engine brake pedal 120 is employed for compression braking of the car. When the pedal 120 is depressed, assuming the gears in neutral or free wheeling, the engine is accelerated through connection to the throttle valve of the carburetor by way of coupling 138, coupling 141, shaft 139, arm 146, link 148, and throttle actuating assembly 147. This same movement causes the gear shifting and clutching operation, due to the engagement of arm 121 with the clip 122 and actuation of the valve rod 112. When the gears are coupled, the arm 63 uncouples elements 138 and 141 through link 144 and bell crank arm 142, and the accelerator coupling is broken. Thereupon the engine acts as a brake, since the throttle is closed and the gears are coupled. Release of the pedal 120 permits the clutch and gears to be disengaged, as heretofore described by depression of the brake pedal.

Having described my invention, I claim:

1. In a speed change transmission, including, a motor, a vehicle, the speed control means for the motor, and the braking means for the vehicle; a set of gears adapted to be engaged, a plurality of devices for coupling said gears, a hand-controlled means for selecting a particular device, a vacuum device in operative connection with the manifold of the engine for uncoupling the gears, a spring actuating said hand controlled means for coupling the gears, a control valve in the connection between the vacuum device and the manifold, said control valve operated by the speed control means for the motor, an intercontrol for said valve, operated by the gear shifting device for high gear, and a connection between said braking means and said intercontrol for operating said intercontrol and causing gear disconnection and free wheeling when the speed control means is released, said intercontrol normally holding the gear shifting means in gear engaging condition.

2. A gear speed change transmission, including, a power source, speed control means, a clutch controlled power shaft, a clutch throw-out lever, a gear shifting rod; a power operated device adapted to move said clutch throw-out lever and translate said gear shifting rod in the named sequence, means for setting said gear shifting rod for selective gear shifting, means for retracting said rod and shifting said gear, and means for controlling the power operated device, said latter means connected to the speed control means for the power source and to the gear shifting rod, operation of said latter means accelerating the power source, engaging the gears, and thereupon decelerating the power source.

3. In a motor driven vehicle including, the motor, a speed control means for the motor, a clutch controlled drive shaft, a brake for the vehicle; a speed change transmission, including sets of gears for different speeds driven by said clutch controlled shaft, means for selecting a particular set of gears for coupling the drive, a spring urged device for coupling the selected set of gears and engaging the clutch, a power device for disengaging the clutch and uncoupling the set of gears, said spring urged device and said power device controlled by the speed control means for the motor for coupling the drive when the speed control means is opened and uncoupling the drive except in high gear when the speed control means is closed, and a brake control device for holding the high gear set in coupled position unless the brake is operated.

4. In a gear change transmission, including, a motor, a vehicle, a speed control means for the motor, and a braking means for the vehicle; a set of gears adapted to transmit the motor drive to the vehicle, a plurality of couplers for the respective gears, a hand controlled means for selecting a particular coupler, a power device for disengaging a certain set of gears and by a spring for engaging the set of gears, a connection between said power device and the gear selection means for shifting the gears, said power device controlled by the speed control means for the motor, auxiliary means for holding the high gear coupler in gear engaging position, and a connection between said braking means and said auxiliary means for operating said auxiliary means and permitting free wheeling when the speed control means is released.

5. In a motor driven vehicle including the motor and its speed control means, the brake for the vehicle, and the speed change gear transmission; a gear coupling means, a device in connection with said gear coupling means for neutralizing the transmission when the speed control means is operated for increasing speed, and independent means for automatically operating the speed control means for increased speed, coupling gears, and operating the speed control means for decreased speed in the named sequence, and thereby causing the engine to act as a brake.

6. A transmission control means, including, the motor, the clutch, and sets of gears to be coupled, means operating the clutch and coupling the gears, an accelerator for the motor, said accelerator controlling the means operating the clutch and shifting the gears, and a compression braking pedal for controlling said means for operating said clutch and coupling the gears independently of the accelerator.

7. A shifting unit for a gear speed change transmission comprising a pair of parallel shafts, slidable elements on one shaft, gear coupling elements on the other shaft, fulcrum levers connecting each element on the first shaft with a respective gear coupling element on the other shaft, a selector rod disposed parallel therewith between said first named shafts including pins adapted for selectively engaging any one of said elements upon rotation of the selector rod, means for rotating said rod and a power actuated device for translating said rod to shift the selected one of said elements.

8. In the control system for the transmission of a motor driven vehicle including, the motor, the accelerator, the brake, and the transmission including gears to be coupled, a vacuum operated device for shifting the clutch and coupling the gears, a valve operated by said accelerator for controlling the vacuum operated device, means operated by the coupling of the gears for high gear for holding said valve in gear coupling position when the transmission is in high gear, and a lever operated by the brake for disengaging said last named means and permitting free wheeling.

9. In a motor driven vehicle, including, the motor, the speed control means for the motor, the drive shaft, and the brake for the vehicle; a speed change transmission, including, sets of gears for different speeds driven by said drive shaft, means for selecting a particular set of gears for connecting the drive, means for coupling the gears when the speed control means is moved for acceleration of the motor, means for uncoupling the gears when the speed control means is moved for decelerating the motor except for high gear, and means for holding the high speed set of gears in coupled position, said last named means rendered ineffective for holding the high speed set of gears in coupled position by operation of the brake.

10. A shifting unit for a gear speed change transmission comprising, a pair of parallel shafts, slidable elements on one shaft, gear coupling elements on the other shaft, fulcrum levers connecting each element on the first shaft with a respective gear coupling element on the other shaft, a selector rod disposed parallel with said first named shafts including pins adapted for selectively engaging any one of said elements upon rotation of the selector rod, means for rotating said rod and a power actuated device for translating said rod to shift the selected one of said elements, means for locking the rod against rotation when the gear coupling elements are in coupling position, and means for interlocking the slidable elements against simultaneous movement.

11. A shifting device for a gear speed change transmission comprising a pair of parallel shafts, slidable elements on one of said shafts, gear coupling elements on the other shaft, fulcrum levers connecting each element on one shaft with an adjacent gear coupling element on the other shaft, a selector rod disposed parallel with said first named shafts including pins adapted to engage any one of said elements upon rotation of the selector rod, means for rotating said rod, a power actuated device for translating said rod to shift the selected one of said elements, and an interlock device for locking the slidable elements against simultaneous movement.

12. In a transmission, gear coupling means, a clutch connected driving means to said transmission, a device for operating said clutch and gear coupling means in sequence, means for controlling said device, an accelerator for controlling the speed of the driving means, said accelerator connected to said means for controlling said device for operating the same, and an independently operated control pedal for operating said device independently of the accelerator, said pedal adapted to be operated by the foot independently of any other control mechanism.

13. A speed control mechanism for the transmission of an automobile or the like, comprising, selector means, a common shifter means controlled by the selector means, accelerator means for the motor driving the transmission, an actuator for the common shifter means, said actuator spring urged in one direction for coupling the gears, means moved by the accelerator for controlling said power means for actuating the common shifter means, means for maintaining the common shifter means in coupling position, and a brake operated arm for actuating said last named means for permitting movement of the common shifter means to uncoupled position when the brake is applied.

14. In a speed control apparatus, a gear selecting and coupling rod, a connection to said rod for rotating the same including a rod, an element fixed on the rod including an abutment, a lever loosely fixed on the rod, a coil spring connected to the element and the lever and constantly urging the abutment against the lever, means for engaging the lever in selected position for the particular gear shifts, and means for holding the gear selector and coupling rod against rotation when in gear coupling position whereby the lever can be moved to certain position in advance of the movement of the rod and upon release of the holding means for the gear coupling rod the rod will follow up the lever.

15. In a motor driven vehicle; a speed change transmission including sets of gears adapted to connect the drive from a power source to a vehicle, means for selecting a particular set of gears for connecting the drive, means for connecting and disconnecting the selected set of gears, holding means for preventing operation of the selector means when the gears are coupled, said selector means including a selector lever independently moved to any one of the series of gear positions and a spring urged means for shifting the selector means to the selected position when the holding means is released, and means coacting with the last named means operable at the will of the operator for automatically accelerating the motor, engaging the drive, and decelerating the motor in the named sequence.

16. In a motor driven vehicle including, the motor, the clutch controlled drive shaft, the throttle for the motor, and the brake for the vehicle, a transmission, including, a set of gears adapted to be selectively coupled to the drive shaft, gear selecting means, clutch actuating and gear coupling means, and a device associated with the brake and operable thereby for maintaining the high speed set of gears in coupled position, said device releasable by actuation of the brake.

17. In a transmission, a clutch controlled drive shaft, a propeller shaft, constantly meshing sets of speed change gears adapted to connect said drive shaft and said propeller shaft, shiftable spring urged coupling elements for connecting said sets of gears to the drive shaft, said coupling elements and gears to be coupled including component teeth having inclined end faces permitting coupling engagement between the teeth when the teeth are engaged end for end, selective gear coupling means and a common device for operating said clutch and selective gear coupling means in sequence.

18. In a transmission, a clutch controlled drive shaft, a propeller shaft, constantly meshing sets of speed change gears adapted to connect said drive shaft and said propeller shaft, shiftable coupling elements for connecting said sets of gears to the drive shaft, said coupling elements and gears to be coupled including component teeth having inclined end faces permitting coupling engagement between the teeth when the teeth are engaged end for end, selective gear coupling means for actuating said gear coupling elements, and a power operated device for operating said clutch and selective gear coupling means in the proper sequence.

19. In a transmission, a clutch controlled drive shaft, a propeller shaft, constantly meshing sets of speed change gears between said drive shaft and said propeller shaft, shiftable coupling elements for connecting said sets of gears to the drive shaft, said coupling elements and gears to be coupled including component teeth having inclined end faces permitting coupling engagement between the teeth when the teeth are engaged end for end, selective gear coupling means for shifting said gear coupling elements, a device for operating said clutch and selective gear coupling means in sequence, means for controlling the speed of the drive shaft, and means on the drive shaft speed control means for controlling the operation of said device.

20. A shifting unit for a speed change gear transmission, comprising, a pair of support rods, a slidable element on one shaft, a slidable gear coupling element on the other shaft, a fulcrum lever connecting the respective elements, a selector means disposed between said support rods, including portions adapted for selectively engaging either of said elements, means for moving said selector means into engagement with either of said elements, and a power actuated device for moving said means to shift the selected one of said elements.

21. In a transmission, a drive shaft, a clutch for controlling said drive shaft, a propeller shaft, constantly meshing sets of speed change gears adapted to connect said drive shaft and said propeller shaft, said propeller shaft in constant drive connection with said speed change gears, shiftable spring urged coupling elements for connecting said sets of gears to said drive shaft, said coupling elements and gears to be coupled including clutch teeth adapted to engage positively only when said coupling elements and gears respectively rotate in one and the same direction, selective gear coupling means and, a common device for operating said clutch and selective gear coupling means in sequence.

22. In a transmission, a drive shaft, a propeller shaft, constantly meshing sets of speed change gears adapted to connect said drive shaft and said propeller shaft, said propeller shaft being in constant drive connection with said speed change gears, shiftable coupling elements for connecting said sets of gears to the drive shaft, said coupling elements and gears including component clutch teeth adapted to engage positively only when said coupling elements and gears rotate in one and the same direction, selective gear coupling means, power means for disengaging the shiftable coupling elements from the gears and, spring means for reengaging the coupling elements and gears after selection through said selective gear coupling means.

23. In a transmission, a drive shaft, a clutch for controlling said drive shaft, a propeller shaft, constantly meshing sets of speed change gears adapted to connect said drive shaft and said propeller shaft, said propeller shaft being in constant drive connection with said speed change gears, shiftable coupling elements for connecting said sets of gears to said drive shaft, said coupling elements and gears including component clutch teeth adapted to engage positively only when said coupling elements and gears rotate in one and the same direction, selective gear coupling means, common power means for disengaging said drive shaft control clutch and for disengaging the shiftable coupling elements from said gears and, spring means for reengaging said shiftable coupling elements and said gears after a gear selection.

PAUL W. NEFF.